Jan. 2, 1951 C. F. ROBBINS 2,536,985
MACHINE FOR MARKING CYLINDRICAL ARTICLES
Filed Feb. 5, 1949 8 Sheets-Sheet 2

Inventor:
Charles F. Robbins,
by Heard Smith Tennant
Attorneys

Jan. 2, 1951             C. F. ROBBINS             2,536,985

MACHINE FOR MARKING CYLINDRICAL ARTICLES

Filed Feb. 5, 1949             8 Sheets-Sheet 5

Inventor:
Charles F. Robbins,
by Heard Smith & Tennant
Attorneys

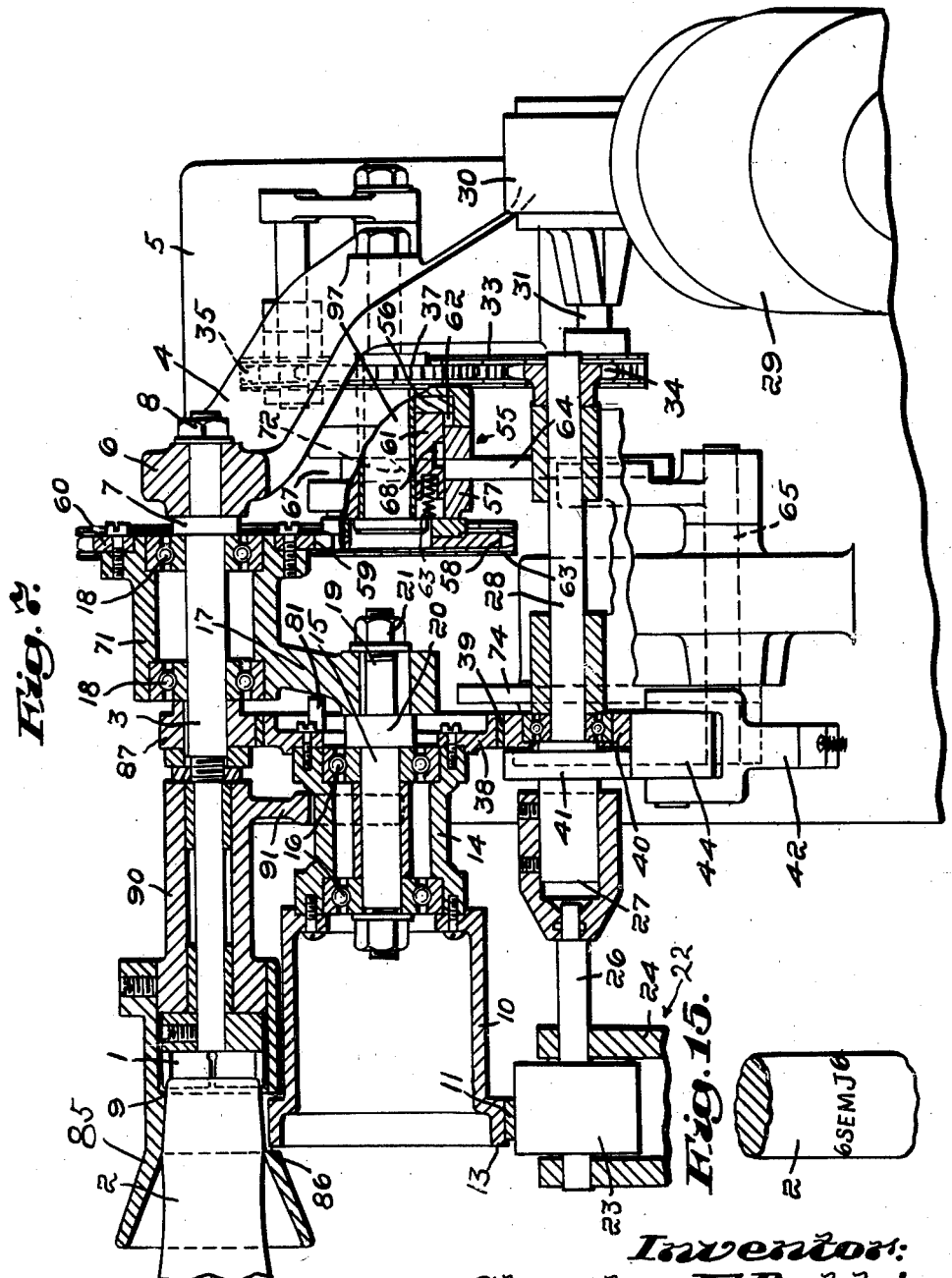

Jan. 2, 1951  C. F. ROBBINS  2,536,985
MACHINE FOR MARKING CYLINDRICAL ARTICLES
Filed Feb. 5, 1949  8 Sheets-Sheet 8
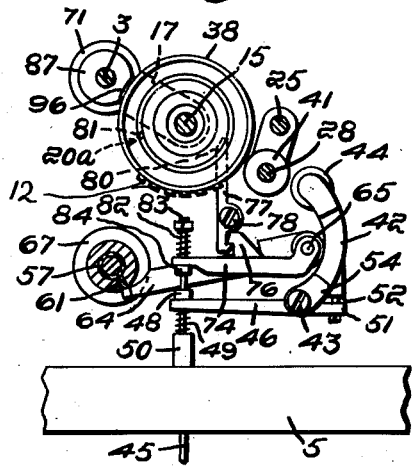
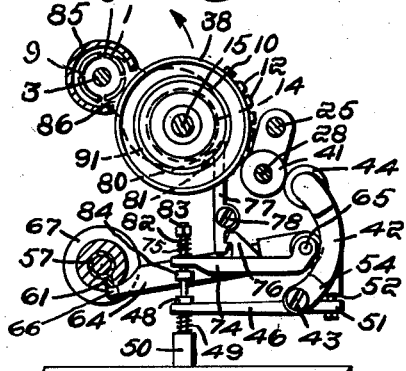
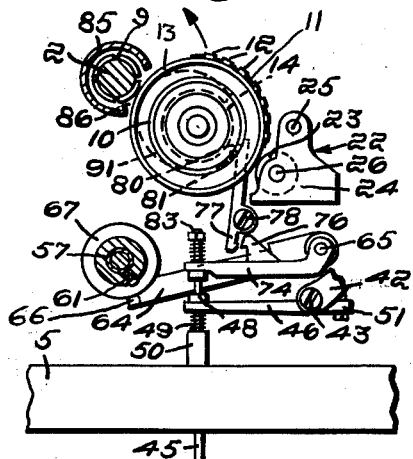
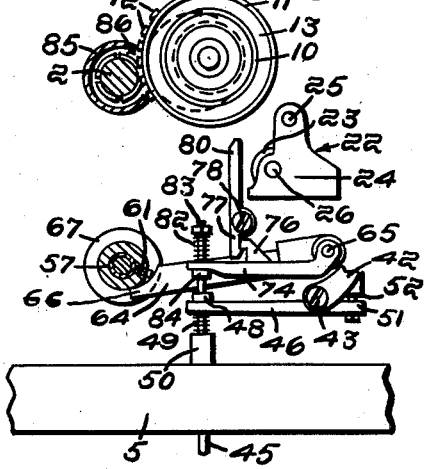
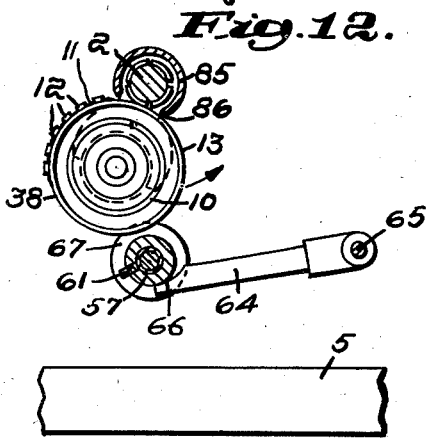
Inventor:
Charles F. Robbins
by Heard Smith Tennant
Attorneys Patented Jan. 2, 1951

2,536,985

UNITED STATES PATENT OFFICE 2,536,985

MACHINE FOR MARKING CYLINDRICAL ARTICLES

Charles F. Robbins, Keene, N. H., assignor to Markem Machine Company, Keene, N. H., a corporation of New Hampshire Application February 5, 1949, Serial No. 74,845

13 Claims. (Cl. 101—36)

This invention relates to a machine for marking or making an imprint on cylindrical articles.

There are some cylindrical articles which it is desirable to provide with an imprint that are of such a delicate and sensitive nature that it is important to hold them stationary in a properly constructed holder or chuck while the imprint is being made thereon, and it is one object of the present invention to provide a marking machine which operates in this manner.

Merely for illustrative purposes reference is made to the vacuum tubes used in television sets as examples of an article which should be held stationary while an imprint is being made thereon.

The machine herein illustrated includes a chuck element for holding the cylindrical article to be marked stationary during the marking operation, a type-carrying element on which is mounted the type for making the imprint circumferentially around the cylindrical article, means for inking the type and means for carrying the inked type bodily about the stationarily held cylindrical article for the purpose of making on said article the desired imprint.

In order to give an understanding of the invention, I have illustrated in the drawings a selected embodiment thereof which will now be described, after which the novel features will be pointed out in the appended claims.

In the drawings:

Fig. 7 is a section on substantially the line 7—7, Fig. 2.

Figs. 8, 9, 10, 11 and 12 are fragmentary views illustrating different positions of the parts during the operation of making an imprint on a cylindrical article circumferentially thereof.

Fig. 13 is a face view of the driving clutch element.

Fig. 14 is a sectional view of the clutch showing the clutch pin in its disengaged position.

Fig. 15 is a perspective view of a portion of a cylindrical article which has been marked by the machine.

Figure 1:
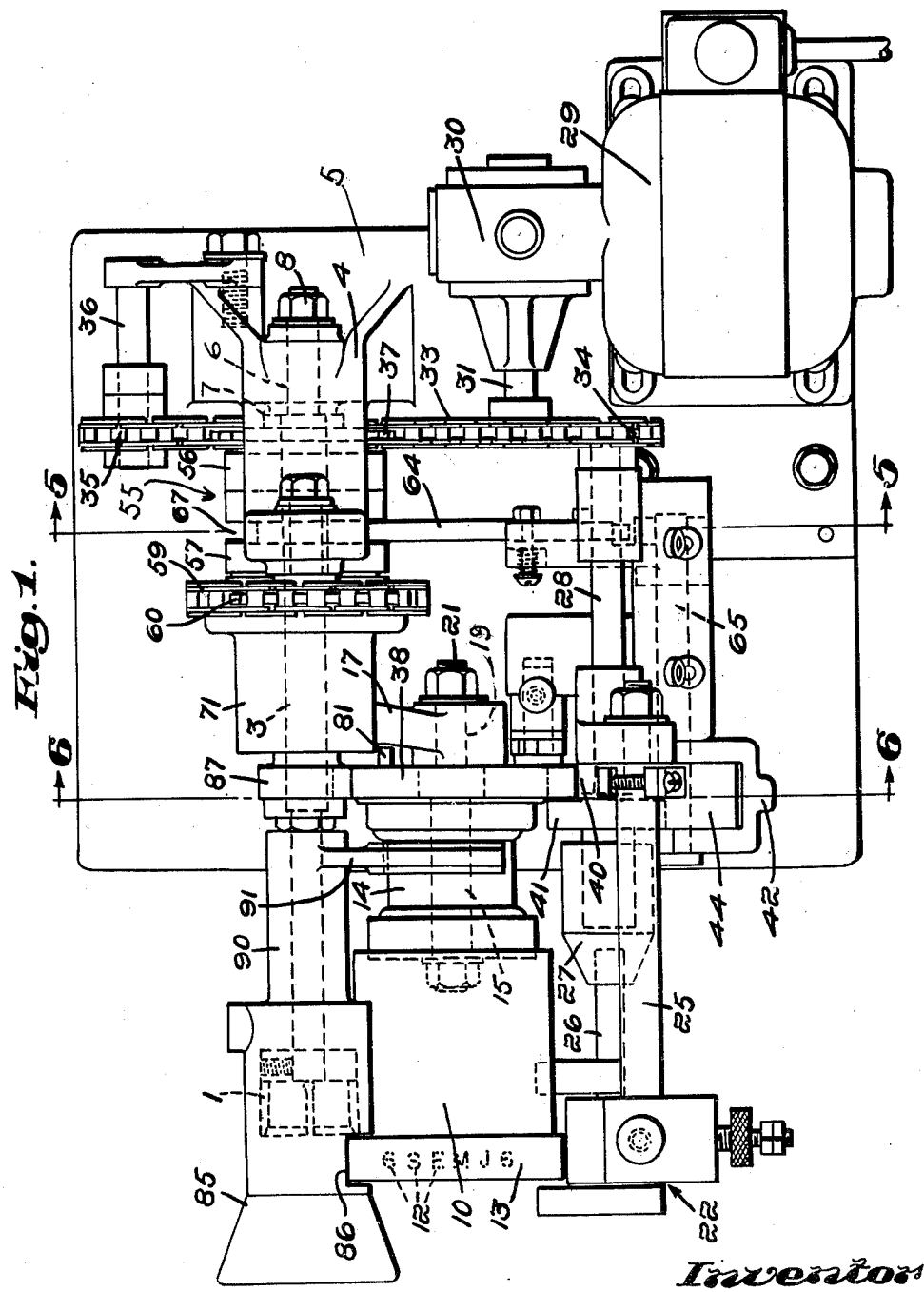
Fig. 1 is a top plan view of a marking machine embodying my invention.

The apparatus herein shown is provided with a stationary chuck element 1 by which the cylindrical article 2 to be marked is held stationary during the making of the imprint thereon. Said chuck is shown as mounted on a stationary shaft or rod 3 which is stationarily held in a supporting arm 4 with which the frame 5 of the machine is provided. Said shaft or rod 3 extends through the arm 4 as shown at 6 and it has fast thereon a collar 7 which engages one side of the arm and has screw threaded thereto a nut 8 by which the shaft is rigidly and firmly clamped to the supporting arm 4.

The chuck 1 will be constructed so as to hold firmly and stationarily the particular cylindrical article which is to be marked in the machine. The chuck herein shown is one which is adapted for use in holding the cylindrical stem 2 of a vacuum tube such as is used in television sets, said chuck having the slots or openings 9 to receive the vacuum tube terminals.

The printing element by which the imprint is made on the tubular article 2 circumferentially thereof is carried by a type-carrying element 10 which is mounted for rotation about an axis parallel to but spaced from the rod or shaft 3.

In the machine herein illustrated the printing element is in the form of a rubber printing pad 11 carrying type characters 12 and said pad 11 is mounted on the periphery of the enlarged portion 13 of the type carrier 10. Said type carrier is shown in the form of a cylindrical member which is secured to a supporting hub 14 that is mounted for rotation about a shaft 15 which extends parallel to the shaft 3 but is spaced therefrom. The hub 14 is preferably mounted on the shaft 15 by means of ball bearings 16.

The shaft 15 is mounted in a carriage element 17 which in turn is mounted for rotation about the stationary shaft 3, ball bearings 18 being preferably provided between the carriage 17 and the shaft 3.

The shaft 15 is rigidly held in the carriage 17, the end 19 of said shaft extending through an opening in the carriage and having a collar 20 thereon which engages one face of the carriage and also having the clamping nut 21 thereon by which the shaft is securely clamped to the carriage.

Normally the type-carrying element 10 is stationary and when a tubular article has been placed in the chuck, then said type carrier is given a rotative movement about its axial shaft 15 during which the type characters 12 are inked, and then the carriage 17 is given a bodily movement about the stationary shaft 3, during which bodily movement the inked type characters 12 roll around the periphery of the cylindrical article and thereby make the desired imprint thereon.

This operation is illustrated in Figs. 10, 11 and 12 wherein Fig. 10 shows the position of the type-carrying element 10 just after it has been inked, and Figs. 11 and 12 show it during its planetary bodily movement about the stationary cylindrical article 2 during which the printed impression is made thereon.

For inking the type characters there is provided an inking mechanism 22 which includes an ink roll 23 with which the type characters contact when the type-carrying element 10 is given its rotary movement about its supporting shaft 15. The ink roll operates in a reservoir 24 which is supported in proper position on a stationary stud 25 with which the frame is provided. The ink mechanism 22 may have any suitable or desirable construction, but I will preferably employ an inking mechanism such as is illustrated in United States Patent No. 2,449,909, September 21, 1948. In this mechanism the ink roll is positively driven and continuously rotated, and for this purpose it is mounted on a shaft 26 journaled in the housing 24 and connected by a suitable coupling 27 with a driving shaft 28 that is journaled in the machine and is constantly driven from a motor 29. Said motor 29 is connected by suitable reducing gearing 30 with a power shaft 31 which carries a sprocket wheel 32 cooperating with a sprocket chain 33. Said chain 33 passes around a sprocket 34 fast on the shaft 28 and also passes around another sprocket 35 rotating on a supporting shaft 36 carried by the frame. Said sprocket chain also has engagement with a sprocket 37 forming part of a clutch mechanism to be presently described.

As stated above the type-carrying member 10 is normally at rest, but when the machine is started, it makes one rotation about its axis thereby to ink the type characters 12 and then it moves bodily about the shaft 3 to make the printed impression on the cylindrical article 2, as shown in Figs. 10, 11 and 12.

The means for rotating the type carrier 10 about its axis for inking the type is actuated from the constantly rotating shaft 28. The hub 14 to which the type-carrying element 10 is secured has fast therewith a ring or collar member 38 provided with a peripheral friction surface 39 which is engaged by a collar 40 that is mounted on the shaft 28 for free rotation. Said shaft 28 has fast thereon a companion collar 41 having the same size as the free collar 40, and means are provided for coupling the constantly rotating collar 41 to the free collar 40 for the purpose of giving the type-carrying element 10 its rotation. For this purpose there is provided an arm 42 which is mounted on a shaft 43 carried by the frame and which carries at its upper end a friction roll 44 that is wide enough to engage both of the collars 41 and 40 simultaneously as shown in Fig. 7.

Figure 6:
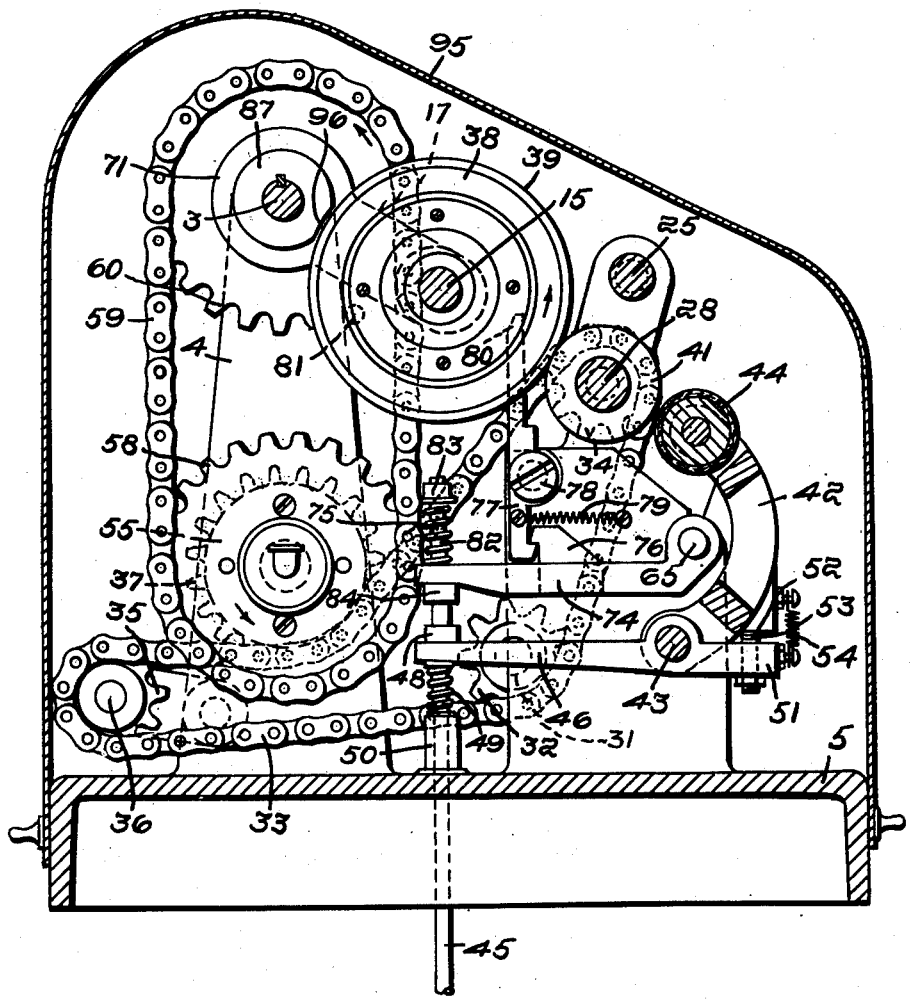
Fig. 6 is a section on substantially the line 6—6, Fig. 1.

Normally the arm 42 is in its retracted position shown in Figs. 6 and 8 in which the friction roll 44 is out of contact with the collars 40 and 41. Suitable means, such for instance as a treadle, is employed however for moving the arm 42 from its inoperative position shown in Fig. 6 into its operative position in which the roll 44 contacts with the two collars 40 and 41. The treadle, not shown, has a link 45 connected thereto, the upper end of which extends through an arm 46 mounted on the shaft 43. Said treadle-actuated link 45 has a collar 48 fast thereon which engages the arm 46 when the treadle is depressed thereby turning said arm counterclockwise, Fig. 6. A spring 49 encircling the link 45 and situated between the arm 46 and a supporting collar 50 serves to return the treadle to normal position when pressure thereon has been released.

The arm 46 is shown as having an extension 51 carrying an adjustable set screw 52 adapted to engage a shoulder 53 with which the lever 42 is provided so that when the treadle is depressed and the lever 46 is moved downwardly the arm 42 will be swung toward the left, Fig. 6, thereby bringing the roll 44 into contact with the collars 41, 42.

54 indicates a spring connecting the arm extension 51 with the arm 42 and yieldingly holding the shoulder 53 in engagement with the set screw 52.

It will, therefore, be seen that when the treadle is depressed and the roll 44 is moved into engagement with the collars 40 and 41, the rotative movement of the collar 41 which it derives from the continuously rotating shaft 28 will be communicated through the transmission roll 44 to the collar 40, and since the collar 40 has frictional peripheral engagement with the collar 38 that is rigid with the type-carrying member 10, said type-carrying member will be given a rotative movement about its supporting shaft 15 as an axis. During such rotative movement the type characters 12 are brought into contact with the ink roll 23 and are thus properly inked.

After the type carrier 10 has been rotated about its axis sufficiently to ink the type, then driving connections are automatically established between the carriage 17 and the sprocket wheel 37 which, it will be remembered, is being constantly rotated from the motor 29 through the medium of the sprocket chain 33, with the result that the carriage 17 is turned bodily about the stationary shaft 3, during which operation the inked type is rolled around the cylindrical article 2 and makes an imprint thereon circumferentially thereof. The driving connections between the sprocket 37 and the carriage 17 include a clutch device 55 which comprises a driving clutch member 56 that is rigid with the sprocket 37 and is thus continuously in rotation, and a driven clutch member 57 to which is rigidly secured a sprocket 58 that is connected by a sprocket chain 59 with a sprocket 60 that is fast to the hub 71 of the carriage 17.

The clutch 55 is of the one revolution type and is normally disengaged, but when thrown into engagement, it will be automatically disengaged again after it makes one revolution.

Any suitable form of one revolution clutch may be employed for connecting the sprockets 37 and 58. That herein shown is a clutch of the type in which the driven clutch member 57 is provided with a sliding clutch pin 61 that is movable in the direction of the axis of the clutch and which when in operative position engages in a groove or slot 62 with which the driving clutch member 56 is provided as shown in Fig. 13.

The clutch pin 61 is normally held in its backward or retracted position out of engagement with the driving clutch member 56 as shown in Fig. 14, and means are provided whereby when the type-carrying member 10 has rotated about its axis sufficiently to ink the type characters 12, the clutch pin 61 will be released and will be moved forwardly into its operative position shown in Fig. 7 by means of a spring 63. As soon as the clutch is thus engaged, the rotative movement of the driving clutch member 56 will be transmitted to the driven clutch member 57 and the sprocket wheel 58, with the result that the sprocket 60 will be given a rotative movement through the medium of the sprocket chain 59. Since the sprocket 60 is rigid with the hub 71 of the carriage 17, said carriage will be rotated about the shaft 3 as an axis thereby carrying the type carrier 10 bodily about the article 2 which is stationarily held in the chuck 1.

In the construction herein shown the clutch pin 61 is held in its inoperative retracted position by a clutch controlling arm 64 which is mounted on a shaft 65 carried by the frame. The free end 66 of this arm operates in a groove 67 with which the driven clutch member 57 is provided and the clutch pin 61 is formed with a notch 68 in which the clutch controlling arm 64 is received when the clutch is at rest and is disengaged as shown in Fig. 14. When the clutch is to be engaged, the clutch controlling arm 64 is moved downwardly, Fig. 5, to withdraw the end 66 from the notch 68 in the clutch pin thereby allowing the spring 63 to throw the clutch pin forwardly into its operative engaged position.

Figure 5:
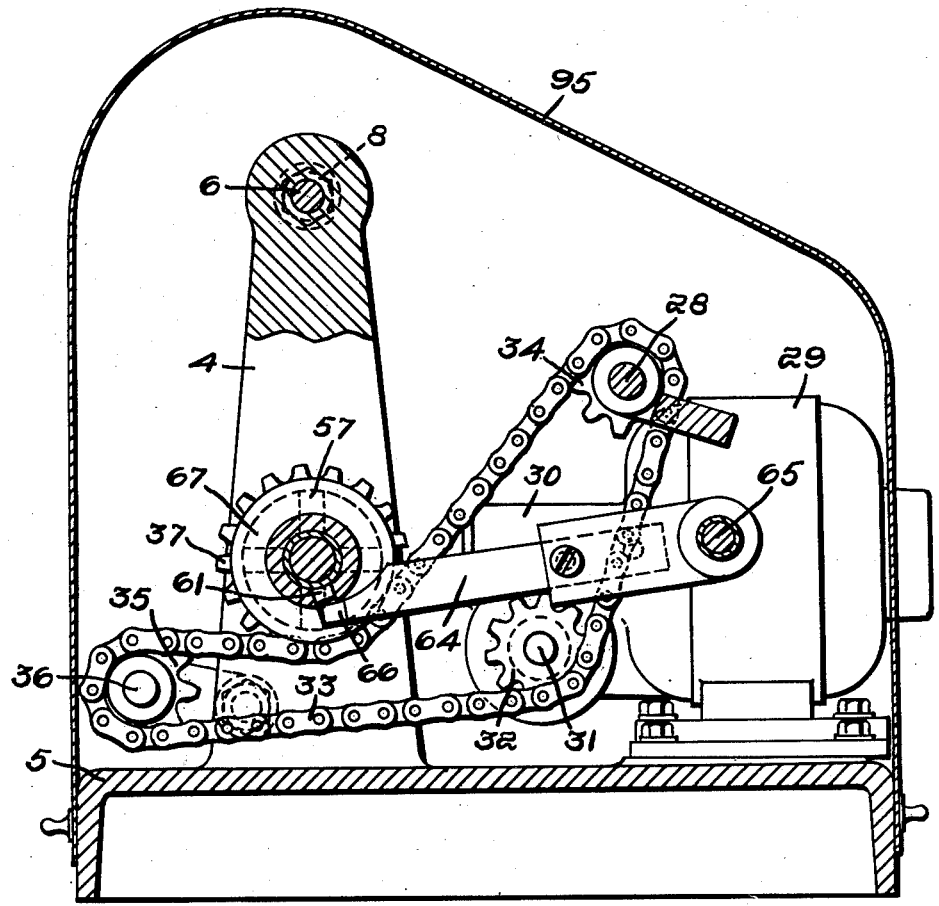
Fig. 5 is a section on substantially the line 5—5, Fig. 1.

After the clutch has been thus engaged, the clutch-controlling arm 64 is allowed to resume its normal position shown in Fig. 5 and when the clutch completes one rotation, the inclined face 66 of the clutch-controlling arm 64 engages one wall of the slot 68 and as the driven clutch member continues its rotation said inclined face 66 has a camming action against the wall of the slot and thus forces the clutch pin backwardly against the action of the spring 63 thereby releasing it from the groove 62 of the driving clutch member.

For thus automatically throwing the clutch into engagement when the type carrier 10 has rotated sufficiently to ink the type, I have provided the following mechanism. The shaft 65 on which the clutch-controlling arm 64 is mounted has mounted thereon and rigid therewith a latch arm 74 which is provided at its free end with an opening through which the upper end 75 of the treadle link 45 extends. This latch arm 74 is provided with a catch 76 that cooperates with a spring pressed latch 77 that is pivotally mounted at 78. The latch 77 is yieldingly held in its operative position in engagement with the catch 76 by means of a spring 79.

The latch 77 is provided with an upper extension 80 which is situated in a position to be engaged by a trip pin 81 that is carried by the friction collar 38. The friction collar 38 is rotated in the direction of the arrow, Fig. 6, and the engagement of the trip pin with the upper end 80 of the latch will swing the latch clockwise in Fig. 6 thereby releasing it from the catch 76. The upper end 75 of the treadle link 45 is encircled by a spring 82 which is confined between the free end of the latch arm 74 and a collar or nut 83 carried at the upper extremity of the link 45.

When the treadle is depressed initially to throw the transmission roll 44 into operative engagement with the collars 40 and 41 for the purpose of setting the type carrier 10 in rotation, the latch arm 74 is locked from downward movement by the catch 77 and hence the spring 82 will be compressed by such downward movement of the link 45.

As soon as the latch 77 is released from the catch 76 by the engagement of the trip pin 81 with the upper end 80 of said latch, the expanding action of the compressed spring 82 will move the latch arm 74 downwardly thereby turning the shaft 65 in a counterclockwise direction and swinging the clutch-controlling arm 64 downwardly into its inoperative position, with the result that the clutch will be thrown into engagement.

When this occurs the operator will release the treadle and the return spring 49 will raise the arm 46 to disengage the transmission roll 44 from the collars 40 and 41 and a collar 84 on the treadle link 45 will engage the latch arm 74 and raise it into its normal position shown in Fig. 6, in which position the catch 76 will be automatically engaged by the spring pressed latch 77.

The stationary chuck 1 is enclosed in a hood 85 which is provided in one side wall with an opening 86 to receive the enlarged end portion 13 of the type-carrying element on which the type plate 11 is mounted.

Means are provided for rotating the hood 85 about the shaft 3 with the carriage 17 so that said opening 86 will be maintained in a position to permit the type 12 to engage the cylindrical article 2 during the bodily rotative movement of said carrier about said article.

For this purpose said hood 85 is provided with a tubular extension 90 which encircles and has bearing on the stationary shaft 3, and said extension 90 is provided with a forked arm 91 which embraces the supporting hub 14 for the type-carrying member 10. Hence when the hub 71 is turned by the sprocket chain 59 thereby to give the type-carrying member its planetary movement about the cylindrical article to be printed, the engagement of the forked arm 91 with the hub 14 will rotate the hood 85 about the shaft 3 thus maintaining proper register between the portion 13 of the type-carrying member 10 and the aperture 86 in the hood.

In order to make a proper printed impression on the cylindrical article 2, means are provided so that as the type carrier is making its planetary movement about the shaft 3, the said type carrier will be also given a rotation on its own axis with the result that the type plate 11 will have a rolling contact with the stationary cylindrical article 2 during the planetary movement of the type carrier about the shaft 3. For this purpose the stationary shaft 3 is provided with a collar 87 which is rigid therewith and is thus non-rotatable, said collar 87 having the same diameter as the cylindrical article 2.

Figure 2:
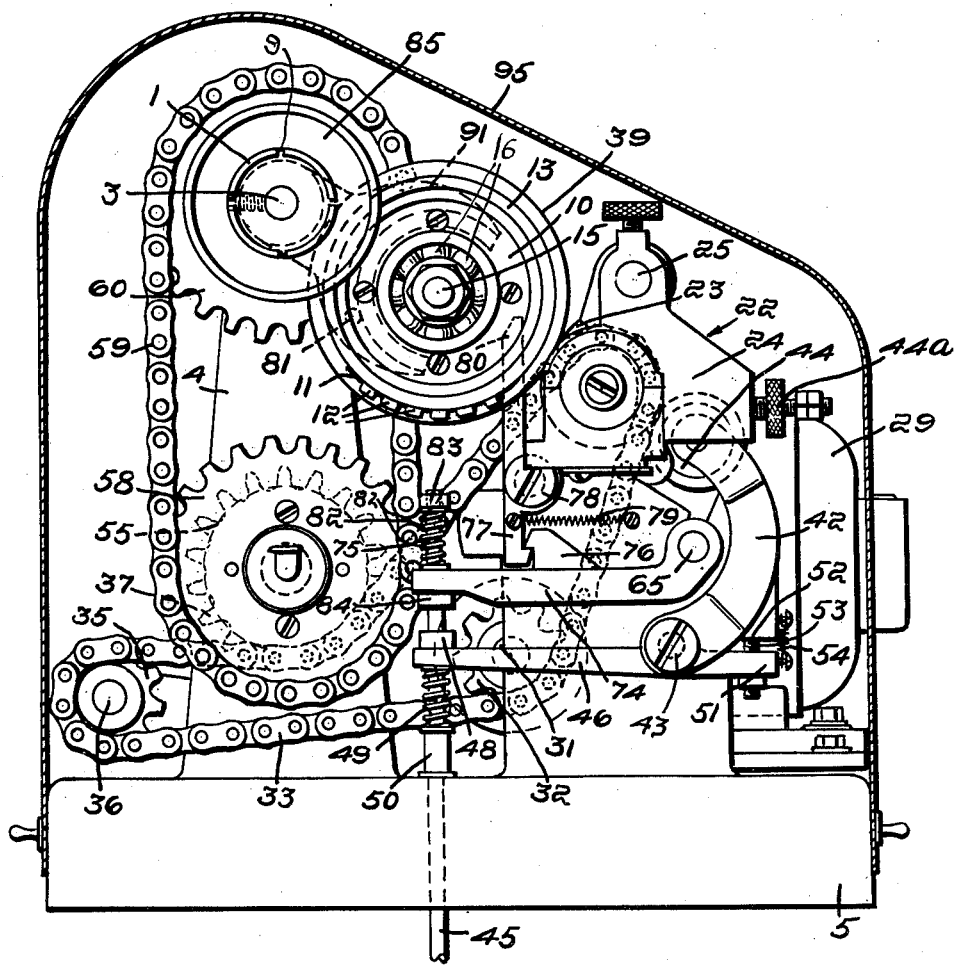
Fig. 2 is a front end view thereof.
Figure 3:
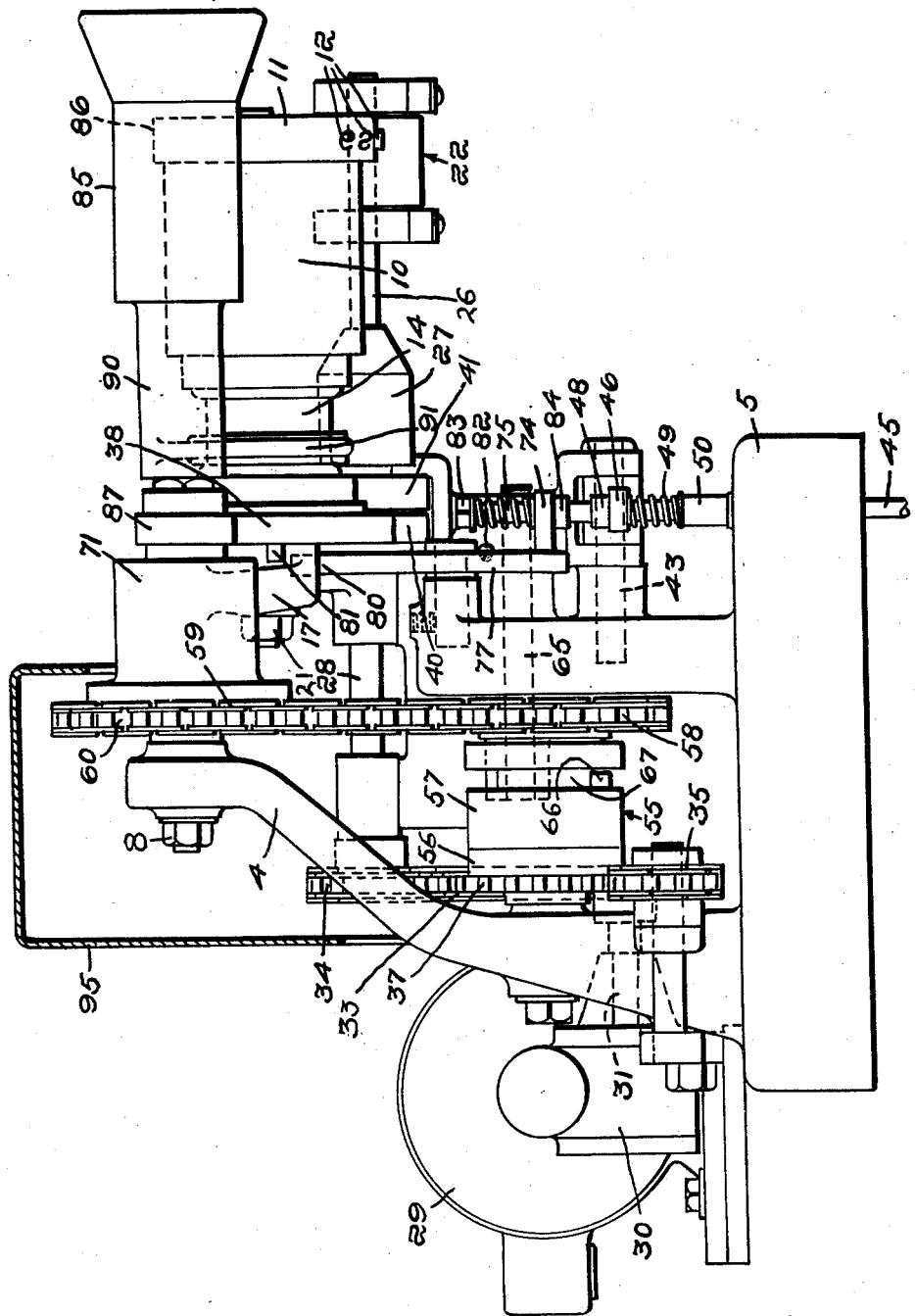
Fig. 3 is a side elevation of the machine with the guard shown in section looking from the left in Fig. 2.
Figure 4:
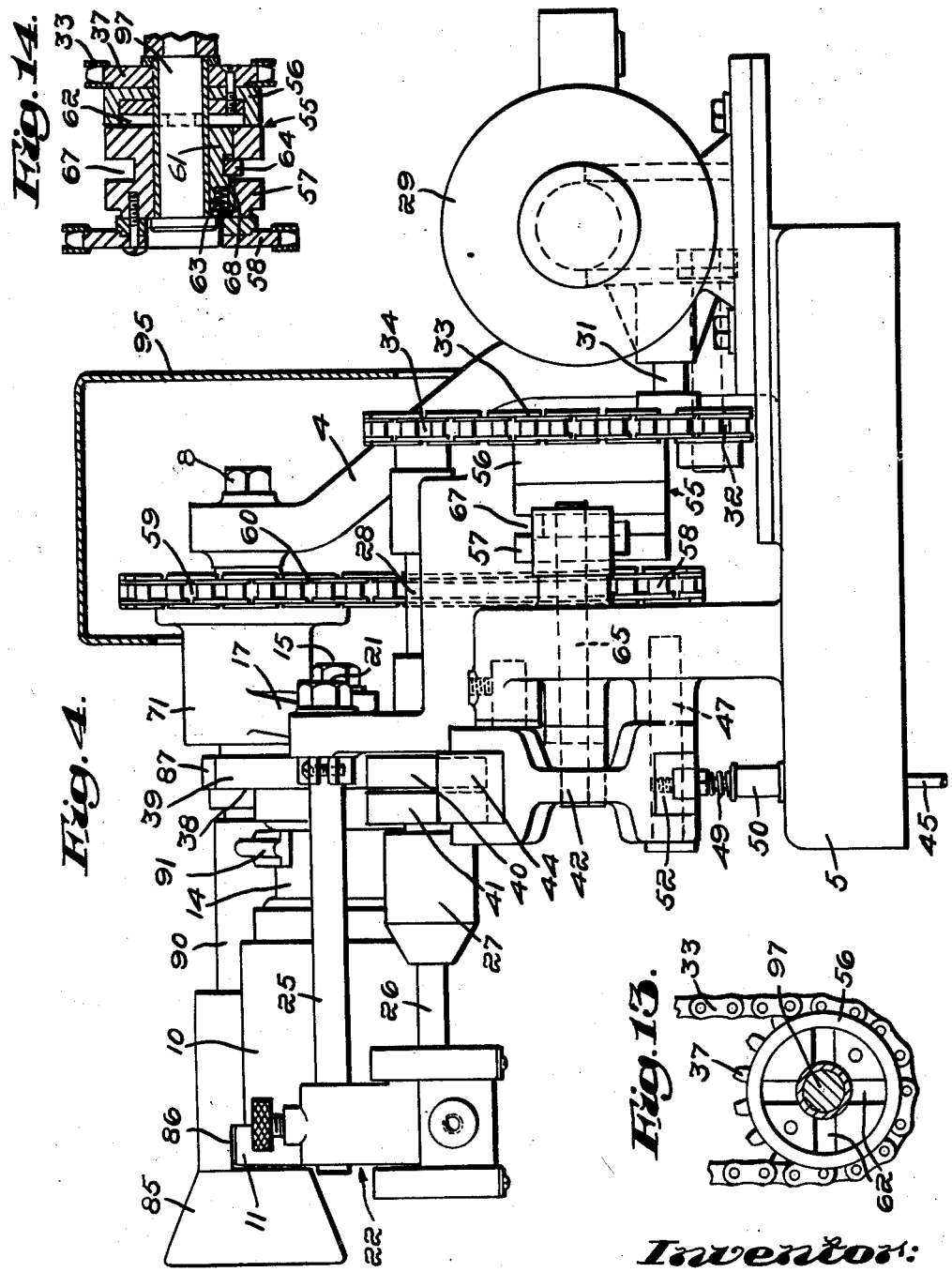
Fig. 4 is a side elevation of the machine with the guard shown in section looking from the right in Fig. 2.

The fixed collar 87 is formed with a notch or indentation 96 in which the collar 38 is received when the type-carrying element is in its normal position shown in Figs. 2, 6 and 8, and hence when the parts are in this position, there is no frictional engagement between the collar 38 and the fixed collar 87.

As soon as the clutch is thrown into operation, however, and the carriage 17 starts on its rotative movement to carry the type-carrying member 10 through its planetary journey about the shaft 3, the frictional surface of the collar 38 moves out of the notch or depression 96 and comes into frictional engagement with the stationary collar 87, which as stated above, has the same diameter as the cylindrical article 2. The collar 38 also has the same cylindrical diameter as the portion of the type-carrying element 10 on which the type pad 11 is mounted. Hence as soon as the carriage 17 with the type-carrying element 10 thereon starts its rotative movement about the shaft 3, the frictional contact of the collar 38 with the fixed collar 87 will cause said collar 38 to have a rolling engagement with the fixed collar 87 during the planetary motion about the shaft 3 thereby turning said collar and the type-carrying element 10 about the shaft 15 during such planetary motion. This results in the type characters 12 having a rolling contact with the stationary cylindrical article 2 by which the desired imprint is made on said cylindrical article.

The sequence of operations of the machine are shown more or less diagrammatically in Figs. 8 to 12.

Fig. 8 shows the machine at rest with the clutch 55 disengaged and with the transmission roll 44 out of engagement with the collars 40 and 41 and with the treadle link 45 in raised position.

When the treadle is depressed the transmission roll 44 is swung forwardly into engagement with the collars 40 and 41 as shown in Fig. 9 and by this means the rotative movement of the continuously rotating shaft 28 is conveyed to the collar 40, which by its frictional engagement with the collar 38 will give rotative movement to the type-carrying element 10 for inking the type 12.

By the time that the type characters are properly inked, the trip pin 81 comes into engagement with the upper end of the trip lever 77 as shown in Fig. 10, thereby releasing the latch arm 74 so that the compressed spring 82 will move said arm downwardly from the position shown in Fig. 9 to that shown in Fig. 10. This movement of the arm 74 operates through the shaft 65 to swing the clutch-controlling arm 64 downwardly from its operative position shown in Fig. 9 to its inoperative position shown in Fig. 10, thereby releasing the clutch pin 61 with the result that the clutch 55 will be engaged.

The engagement of the clutch 55 operates through the sprocket wheels 58 and 60 and sprocket chain 59 to rotate the carriage 17 about the shaft 3 as shown in Figs. 11 and 12, and during this rotative movement the type-carrying element 10 is given a rotation about its own axis by the engagement of the collar 38 with the stationary collar 87 so that the type plate 11 will have a rolling engagement with the cylindrical article 2 during the planetary journey of said type carrier about the article and thereby an imprint will be made on the article extending circumferentially thereof. As stated above the operator will release the treadle as soon as the type carrier 10 starts its planetary movement and as a result, the machine will come to rest after the clutch has made one revolution with the parts in the position shown in Fig. 6.

I claim:

1. A machine for marking cylindrical articles comprising a stationary chuck for holding stationary the cylindrical article to be marked, a type-carrying member, type carried thereby, means to give said type-carrying member a rotative movement about a stationary axis parallel to but spaced from the axis of the chuck, means to ink the type during such rotative movement, and means operative after the type has been inked to give the type-carrying member with its inked type a planetary movement about the stationarily held cylindrical article with the type in contact therewith, thereby to make a printed impression thereon.

2. A machine for marking cylindrical articles comprising a stationary chuck for holding stationary the cylindrical article to be marked, a cylindrical type-carrying member having type on its periphery, means supporting said type-carrying member to rotate about a stationary axis parallel to but spaced from the axis of the chuck, means to ink the type during such rotation, and means operative after the type has been inked to give the type-carrying member a planetary movement around the stationarily held cylindrical article, thereby to make a printed impression thereon.

3. A machine for marking cylindrical articles comprising a stationary chuck for holding stationary the cylindrical article to be marked, a cylindrical type-carrying member having type on its periphery, means supporting said type-carrying member to rotate about an axis parallel to but spaced from the axis of the chuck, means to ink the type during such rotation, and means rendered operative by the rotative movement of the type-carrying member about its axis after the type has been inked to give said member a planetary movement about a cylindrical article held stationary in said chuck, thereby to make a printed impression on said article.

4. A machine for marking cylindrical articles comprising a stationary chuck for holding stationary a cylindrical article to be marked, a type-carrying member having a cylindrical type-carrying surface, the axis of which surface is parallel to but spaced from that of a cylindrical article held in the chuck, a printing element carried on said cylindrical surface, means to turn said type-carrying member about its axis, means maintaining said axis stationary during such turning movement, means for inking the printing element while it is turning about its stationary axis, and means to give the type-carrying member with its inked printing element a planetary movement about a cylindrical article held in the chuck, thereby to make a printed impression thereon.

5. A machine for marking cylindrical articles comprising a stationary chuck for holding stationary a cylindrical article to be marked, a carriage mounted for rotative movement about the axis of a cylindrical article held in said chuck, a printing element mounted on said carriage for rotation about an axis parallel to but spaced from that of said cylindrical article, means to turn said printing element about its axis while the carriage is stationary, means to ink said printing element during such turning movement, and means operative after the printing element has been inked to give said carriage a rotary motion about its axis and thereby give the printing element a planetary motion about the cylindrical article by which a printed impression is made thereon.

6. A machine for marking cylindrical articles comprising a stationary chuck for holding stationary a cylindrical article to be marked, a carriage mounted for rotative movement about the axis of a cylindrical article held in said chuck, a printing element mounted on said carriage for rotation about an axis parallel to but spaced from that of said cylindrical article, means to turn said printing element about its axis while the carriage is stationary, means to ink said printing element during such turning movement, means rendered operative by the turning movement of the printing element after the latter has been inked to give said carriage a rotary motion about its axis and thereby give the inked printing element a planetary motion about the stationary cylindrical article.

7. A machine for marking cylindrical articles comprising a stationary chuck for holding stationary the cylindrical article to be marked, a type-carrying member, type carried thereby, means to give the type-carrying member a turning movement about a stationary axis, means to ink the type during such turning movement, means operative after the type is inked to give said type-carrying member a planetary movement about a cylindrical article held in said chuck with the type in contact with said article, and means to rotate the type-carrying member about its own axis during such planetary motion, whereby the type will have a rolling contact with the cylindrical article.

8. A machine for marking cylindrical articles comprising means for holding stationary a cylindrical article to be marked, a cylindrical type-carrying member, type carried thereby, means to give the type-carrying member a turning movement about its axis, means maintaining said axis stationary during such turning movement, means to ink the type as the type-carrying member turns, means rendered operative by said turning movement of the type-carrying member to give the latter a planetary movement about said stationarily held cylindrical article and with the type in contact with said cylindrical article, and means to rotate the type-carrying member about its own axis during such planetary motion, whereby the type will have a rolling contact with the cylindrical article.

9. A machine for marking cylindrical articles comprising a stationary chuck for holding stationary a cylindrical article to be marked, a cylindrical type-carrying member mounted for rotation about an axis parallel to but spaced from that of a cylindrical article held in said chuck, means to give the type-carrying member a turning movement about a stationary axis, means to ink said member during such turning movement, means, including a clutch, for giving the type-carrying member with its inked type a planetary motion around a cylindrical article held in said chuck with the type in contact with the cylindrical article, and clutch-controlling means rendered operative by the turning movement of the type-carrying member during which the type is inked.

10. A machine for marking cylindrical articles comprising a stationary chuck for holding stationary a cylindrical article to be marked, a normally stationary carriage mounted for turning movement about the axis of a cylindrical article held in said chuck, a printing element mounted on said carriage for rotation about an axis parallel to but spaced from the axis of the chuck, means to give the printing element a partial turning movement about its axis while the carriage is stationary, an ink roll for inking the printing element during such partial turning movement, and means rendered operative after the printing element has been inked to rotate the carriage about its axis thereby giving the inked printing element a planetary motion about a cylindrical article held in said chuck.

11. A machine for marking cylindrical articles comprising a stationary chuck for holding stationary a cylindrical article to be marked, a normally stationary carriage mounted for turning movement about the axis of a cylindrical article held in said chuck, a printing element mounted on said carriage for rotation about an axis parallel to but spaced from the axis of the chuck, means to give the printing element a partial turning movement about its axis while the carriage is stationary, an ink roll for inking the printing element during such partial turning movement, and means rendered operative after the printing element has been inked to rotate the carriage about its axis thereby giving the inked printing element a planetary motion about a cylindrical article held in said chuck, and means to rotate the printing element about its axis during such planetary motion whereby it will have a rolling contact with the cylindrical article.

12. A machine for marking cylindrical articles comprising a stationary chuck for holding stationary a cylindrical article to be marked, a normally stationary carriage mounted for turning movement about the axis of a cylindrical article held in said chuck, a printing element mounted on said carriage for rotation about an axis parallel to but spaced from the axis of the chuck, means to give the printing element a partial turning movement about its axis while the carriage is stationary, an ink roll for inking the printing element during such partial turning movement, means including a clutch to rotate the carriage about its axis thereby to give the printing element a planetary motion about the cylindrical article, and means to render the clutch operative by said partial turning movement of the printing element.

13. A machine for marking cylindrical articles comprising a stationary chuck for holding stationary a cylindrical article to be marked, a normally stationary carriage mounted for turning movement about the axis of a cylindrical article held in said chuck, a printing element mounted on said carriage for rotation about an axis parallel to but spaced from the axis of the chuck, means to give the printing element a partial turning movement about its axis while the carriage is stationary, an ink roll for inking the printing element during such partial turning movement, means including a clutch to rotate the carriage about its axis thereby to give the printing element a planetary motion about the cylindrical article, and means to render the clutch operative by said partial turning movement of the printing element, and means to rotate the printing element about its own axis during such planetary motion whereby it will have a rolling contact with the cylindrical article.

CHARLES F. ROBBINS.

REFERENCES CITED

The following references are of record in the file of this patent:

UNITED STATES PATENTS

| Number | Name | Date |
| --- | --- | --- |
| 425,807 | Leach | Apr. 15, 1890 |
| 1,724,749 | Conant | Aug. 13, 1929 |
| 1,914,035 | Moeschlin | June 13, 1933 |
| 2,449,909 | Putnam et al. | Sept. 21, 1948 |